(12) United States Patent
Wohlgemuth (10) Patent No.: US 10,883,864 B1
(45) Date of Patent: Jan. 5, 2021

(54) APPARATUS FOR SUPPORTING SENSOR ABOVE OPEN TOP OF CONTAINMENT STRUCTURE TO MONITOR LOADING OF PARTICULATE MATERIAL INTO SAME

(71) Applicant: Roland Wohlgemuth, Durban (CA)

(72) Inventor: Roland Wohlgemuth, Durban (CA)

( * ) Notice: Subject to any disclaimer, the term of this patent is extended or adjusted under 35 U.S.C. 154(b) by 0 days.

(21) Appl. No.: 16/593,306

(22) Filed: Oct. 4, 2019

(51) Int. Cl.
*G01D 11/30* (2006.01)
*B65D 90/48* (2006.01)

(52) U.S. Cl.
CPC .............. *G01D 11/30* (2013.01); *B65D 90/48* (2013.01)

(58) Field of Classification Search
CPC ........ G01D 11/30; B65D 90/48; B65F 1/1638
USPC .......................................... 73/866.5; 414/289
See application file for complete search history.

(56) References Cited

U.S. PATENT DOCUMENTS

| 2007/0084283 A1* | 4/2007 | Carlson | ............... | H04Q 9/00 |
| | | | | 73/290 V |
| 2016/0252384 A1* | 9/2016 | Wilson | ............... | A01D 41/00 |
| | | | | 73/149 |

FOREIGN PATENT DOCUMENTS

CA          2786073 A1 *   2/2013   ......... G01F 23/0007

* cited by examiner

*Primary Examiner* — John Fitzgerald
*Assistant Examiner* — Rodney T Frank
(74) *Attorney, Agent, or Firm* — Christopher J Dynowski; Ryan W. Dupuis; Ade & Company Inc.

(57) ABSTRACT

An apparatus for supporting a sensor configured to monitor loading of particulate material through an open top of a containment structure, which includes a covering sheet movable between an extended position in which the sheet spans across the open top to substantially enclose an interior of the structure and a retracted position in which the open top is substantially unobstructed by the sheet so that the particulate material can be suitably loaded into the interior, comprises a sensor support arm mounted to the containment structure at a location within a periphery thereof and lying along a movement path of the covering sheet between its two positions. The sensor is mounted on a raised distal end of the arm still located within the structure periphery. The arm is movable to a lowered transport position responsive to the movement of the covering sheet from the retracted to the extended position.

15 Claims, 6 Drawing Sheets

APPARATUS FOR SUPPORTING SENSOR ABOVE OPEN TOP OF CONTAINMENT STRUCTURE TO MONITOR LOADING OF PARTICULATE MATERIAL INTO SAME

FIELD OF THE INVENTION

The present invention relates generally to an apparatus for supporting a sensor above an open top of a containment structure to monitor loading of particulate material into the containment structure, and more particularly to such an apparatus which is arranged to support the sensor within a periphery of the containment structure that is defined by its perimeter walls, tops of which define the open top of the structure.

BACKGROUND

One example of containment structure having a plurality of perimeter walls upstanding from a bottom of the containment structure to delimit thereover an interior for containing the particulate material, and having an open top defined by tops of the perimeter walls through which the particulate material is passed into the interior, is that of a dry goods bulk trailer such as highway grain hopper trailer, which is towed by a highway tractor so as to be portable. During loading of a fluidic dry particulate material such as grain which restrictively flows due to friction between individual particles it is often required that a driver of the highway tractor towing the grain hopper trailer reposition the dry goods bulk trailer relative to a discharge outlet out of which the grain is passing into the trailer, so that the particulate material can be suitably uniformly distributed in an interior of the trailer. Human visual inspection for monitoring the loading of the particulate material typically involves climbing the containment structure so as to position one's line of sight at the top of the containment structure looking inside; however this is hazardous due to the potential risk of a fall. Furthermore it is desirable to remotely monitor the loading of the material, for example from inside the highway tractor.

SUMMARY OF THE INVENTION

According to an aspect of the invention there is provided an apparatus for supporting a sensor configured to monitor loading of particulate material into a containment structure having a plurality of perimeter walls upstanding from a bottom of the containment structure to delimit thereover an interior for containing the particulate material, the containment structure having an open top defined by tops of the perimeter walls through which the particulate material is passed into the interior, the open top of the containment structure being selectively coverable by a covering sheet arranged to span across the open top of the containment structure in an extended position to substantially enclose the interior of the containment structure, the covering sheet being operatively configured for movement relative to the open top between the extended position and a retracted position in which the open top is substantially unobstructed by the covering sheet so that the particulate material can be suitably loaded into the containment structure through the open top thereof, the apparatus comprising:

a sensor support arm extending from a mounting end arranged for attaching to the containment structure at a location which is within a periphery of the containment structure defined by the perimeter walls and lying along a path of the movement of the covering sheet from the retracted position to the extended position, to a distal end of the sensor support arm arranged to be disposed above the tops of the perimeter walls at a location within the periphery of the containment structure in a raised monitoring position of the sensor support arm;

the sensor support arm being configured to receive the sensor at or in proximity to the distal end thereof so as to locate the sensor over the bottom of the containment structure and above the tops of the perimeter walls in the raised monitoring position of the sensor support arm; and the sensor support arm being arranged to be movable relative to the perimeter walls of the containment structure from the raised monitoring position to a lowered transport position in which the distal end of the sensor support arm is arranged to be substantially received in the interior of the containment structure responsive to the movement of the covering sheet from the retracted position to the extended position.

This provides an arrangement which positions the sensor vertically above the containment structure and which can remain mounted to the containment structure even when not in use to monitor loading, such as when the covering sheet in the extended position. Furthermore, the sensor is protected by the covering sheet during transport as it is contained within the enclosed interior formed by the covering sheet disposed in the extended position.

In the illustrated arrangement, the sensor support arm is arranged to be displaced from the raised monitoring position to the lowered transport position upon engagement with a movable leading end of the covering sheet which is movable relative to an anchored end of the covering sheet attached in fixed relation to the containment structure.

In the illustrated arrangement, in the raised monitoring position the sensor support arm is arranged to be inclined upwardly and in a direction of the movement of the covering sheet from the retracted position to the extended position.

In the illustrated arrangement, the apparatus includes a biasing element operatively coupled to the sensor support arm for biasing the sensor support arm to the raised monitoring position.

In the illustrated arrangement, the biasing element is arranged to resist compression between opposite ends thereof so as to bias the sensor support arm to the raised monitoring position.

In the illustrated arrangement, the biasing element is a gas spring.

In the illustrated arrangement, the apparatus further includes a stationary second arm which is distinct from the sensor support arm and arranged to be connected in fixed relation to the containment structure, the stationary second arm being arranged to extend into the interior of the containment structure, and wherein a first one of the opposite ends of the biasing element is operatively connected to the sensor support arm and a second one of the opposite ends is operatively connected to the stationary second arm.

In the illustrated arrangement, the sensor support arm is pivotally movable between the raised monitoring and lowered transport positions, and the biasing element is oriented more vertically upright in the lowered transport position of the sensor support arm than in the raised monitoring position thereof.

In the illustrated arrangement, the sensor support arm extends in a generally longitudinal direction from the mounting end to the distal end, and includes a thickened base portion at or adjacent the mounting end which is enlarged relative to a distal portion of the sensor support arm defining the distal end in a thickness direction transverse to the longitudinal direction.

In the illustrated arrangement, the mounting end of the sensor support arm is arranged to be attached to or in proximity to the top of one of the perimeter walls of the containment structure.

In the illustrated arrangement, when the covering sheet is located substantially to one side of the containment structure at one of the perimeter walls in the retracted position of the covering sheet, the mounting end of the sensor support arm is arranged to be attached to said one of the perimeter walls.

In the illustrated arrangement, the sensor support arm is pivotally movable from the raised monitoring position to the lowered transport position about a pivot axis defined at the mounting end of the sensor support arm.

In the illustrated arrangement, the pivot axis is arranged to be oriented substantially perpendicularly to a direction of movement of the covering sheet from the retracted position to the extended position.

In the illustrated arrangement, when (i) the containment structure is longitudinally elongated, so as to comprise a laterally opposite pair of the perimeter walls extending longitudinally of the containment structure which are sized larger in width in the longitudinal direction than a width in a lateral direction of a longitudinally opposite pair of the perimeter walls extending laterally of the containment structure, (ii) the covering sheet is movable from the retracted position to the extended position in the lateral direction of the containment structure, and (iii) the containment structure includes at least one arched cover supporting cross-member arranged to support the covering sheet in the extended position, the at least one arched cover supporting cross-member spanning laterally between the laterally opposite pair of the perimeter walls and extending above the tops thereof so as to have a central apex raised above opposite lower ends of the at least one arched cover supporting cross-member, the sensor support arm is arranged to extend substantially laterally of the containment structure and follows a generally curved path from the mounting end to the distal end so as to generally match a shape of the at least one arched cover supporting cross-member between the apex and one of the lower ends.

In the illustrated arrangement, when the containment structure further includes at least one longitudinally extending cover support member arranged to cooperate with the at least one arched cover supporting cross-member to support the covering sheet in the extended position, the at least one longitudinal cover support member extending crosswise to said at least one arched cover supporting cross-member at a location beneath the sensor support arm in the raised monitoring position, the sensor support arm comprises a reduced thickness portion arranged to overlay the at least one longitudinal cover support member and be substantially sandwiched between said at least one longitudinal cover support member and the covering sheet in the lowered transport position.

According to another aspect of the invention there is provided an apparatus for monitoring loading of particulate material into a containment structure having a plurality of perimeter walls upstanding from a bottom of the containment structure to delimit thereover an interior for containing the particulate material, the containment structure having an open top defined by tops of the perimeter walls through which the particulate material is passed into the interior, the open top of the containment structure being selectively coverable by a covering sheet arranged to span across the open top of the containment structure in an extended position to substantially enclose the interior of the containment structure, the covering sheet being operatively configured for movement relative to the open top between the extended position and a retracted position in which the open top is substantially unobstructed by the covering sheet so that the particulate material can be suitably loaded into the containment structure through the open top thereof, in combination with the containment structure the apparatus comprising:

a sensor support arm extending from a mounting end attached to the containment structure at a location which is within a periphery of the containment structure defined by the perimeter walls and lying along a path of the movement of the covering sheet from the retracted position to the extended position, to a distal end of the sensor support arm disposed above the tops of the perimeter walls at a location within the periphery of the containment structure in a raised monitoring position of the sensor support arm;

the sensor support arm being configured to receive the sensor at or in proximity to the distal end thereof so as to locate the sensor over the bottom of the containment structure and above the tops of the perimeter walls in the raised monitoring position of the sensor support arm; and the sensor support arm being movable relative to the perimeter walls of the containment structure from the raised monitoring position to a lowered transport position in which the distal end of the sensor support arm is substantially received in the interior of the containment structure responsive to the movement of the covering sheet from the retracted position to the extended position.

BRIEF DESCRIPTION OF THE DRAWINGS

The invention will now be described in conjunction with the accompanying drawings in which.

In the drawings like characters of reference indicate corresponding parts in the different figures.

DETAILED DESCRIPTION

The accompanying figures schematically show an apparatus, which is generally indicated at reference numeral 50, for supporting a sensor 100 which is configured to monitor loading of particulate material into a containment structure 1 such as that of a dry goods bulk trailer 2, for example a highway grain hopper trailer, which is towed behind a highway tractor (not shown) across a road surface so as to be portable.

Figure 1:
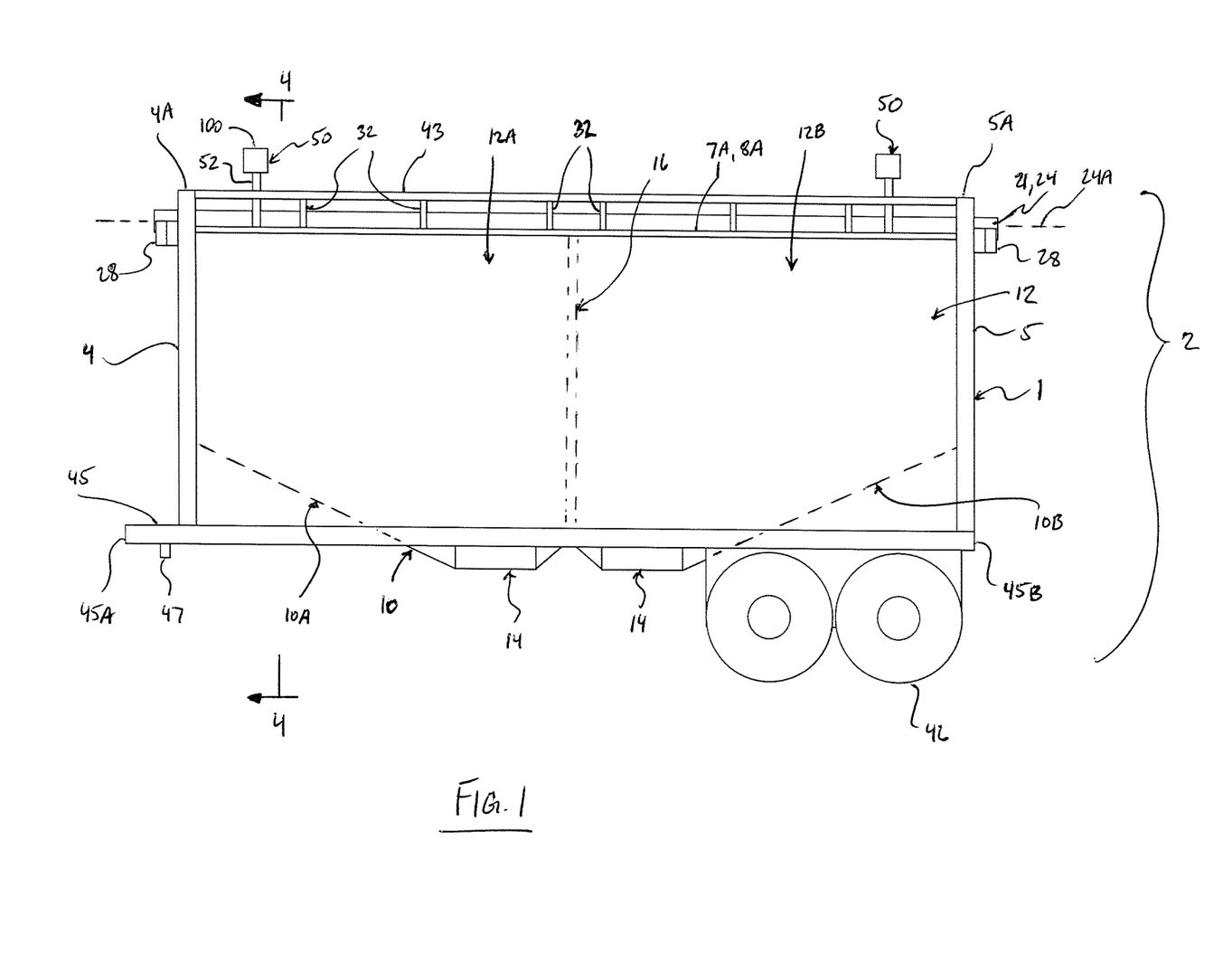
FIG. 1 is a side view of a containment structure with an apparatus for supporting a loading-monitoring sensor according to an arrangement of the present invention mounted thereon and disposed in a raised monitoring position.
Figure 2A:
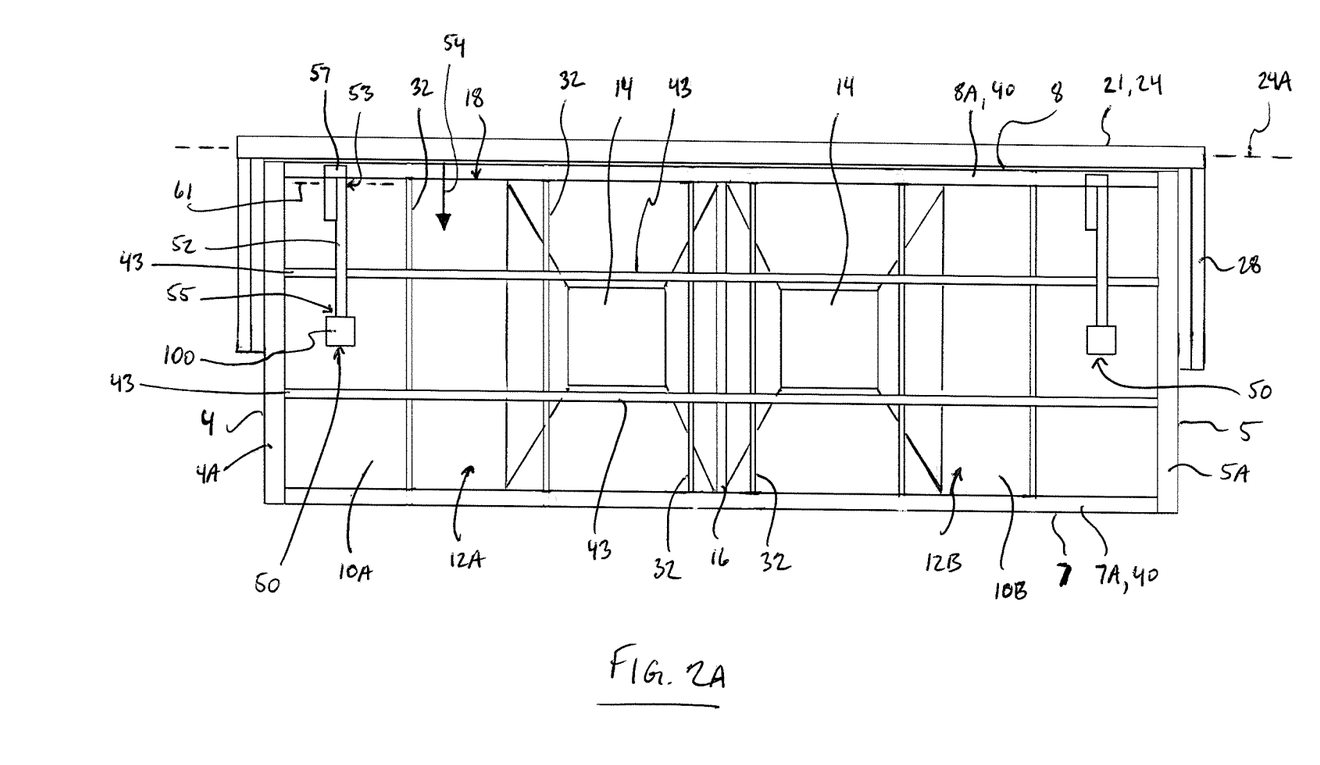
FIG. 2A is a top plan view of the arrangement as shown in FIG. 1.
Figure 2B:
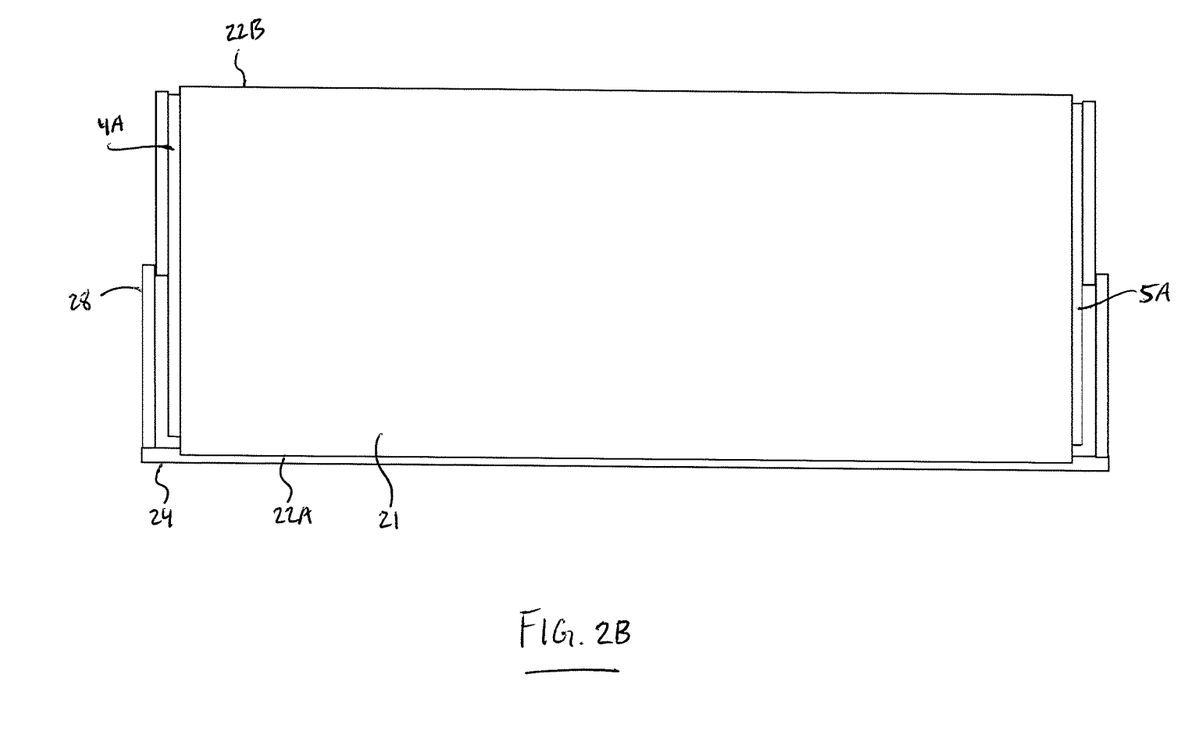
FIG. 2B is a top plan view similar to FIG. 2A but showing a covering sheet in an extended position.
Figure 3:
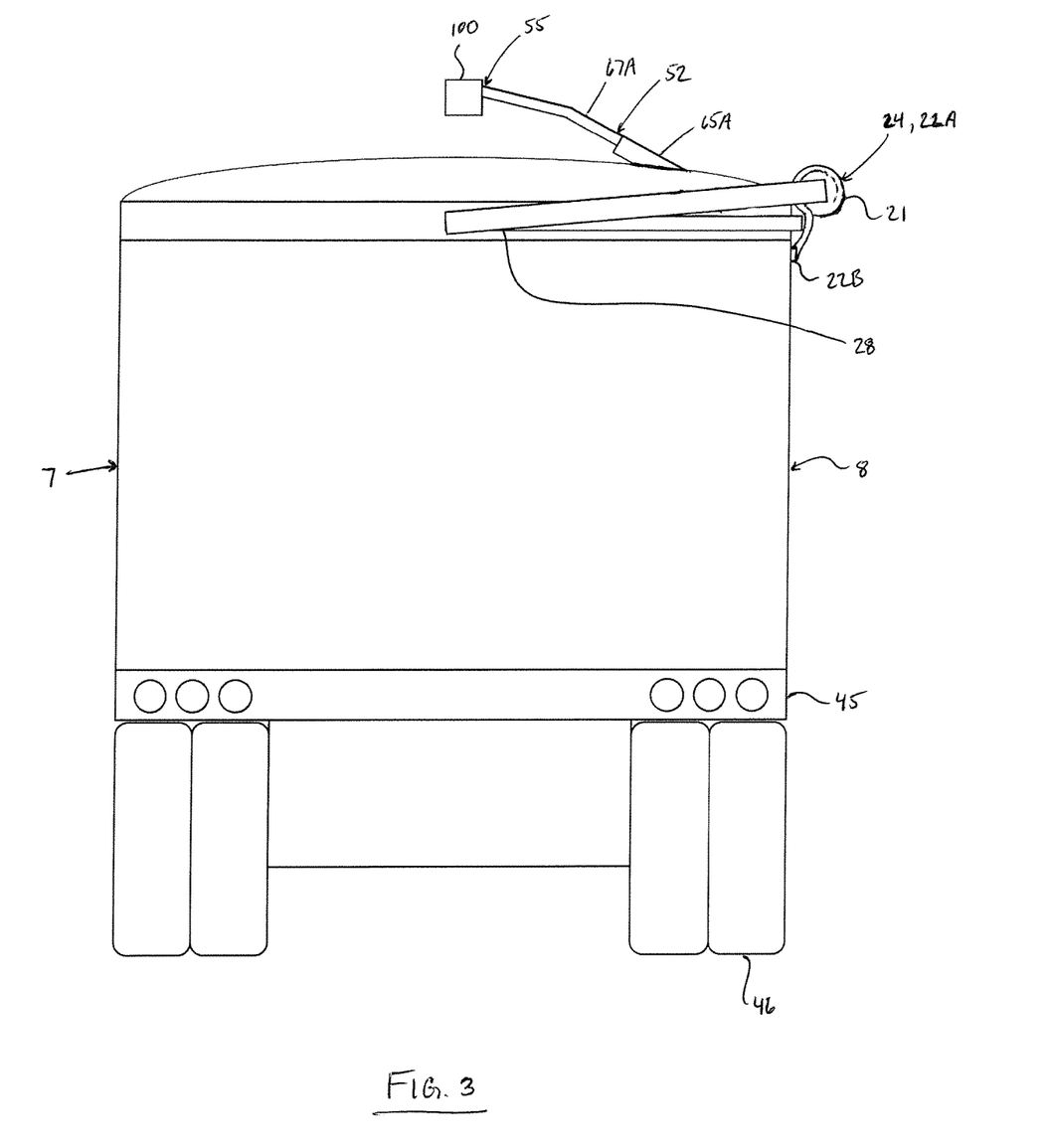
FIG. 3 is an end view of the arrangement as shown in FIG. 1.

Turning first to the containment structure 1, which is also schematically shown in the accompanying figures, and referring to FIGS. 1-3, the structure 1 has a plurality of perimeter walls including longitudinally spaced apart front and rear walls 4, 5 and laterally spaced apart side walls 7, 8. Each opposite pair of the perimeter walls are parallel to one another. In the illustrated arrangement, the containment structure 1 is longitudinally elongated, such that the laterally opposite pair of the perimeter walls 7, 8 which extend longitudinally of the containment structure are sized larger in width in the longitudinal direction than a width in a lateral direction of the longitudinally opposite pair of the perimeter walls 4, 5 which extend laterally of the containment structure. The perimeter walls form a rectangular periphery of the containment structure such that each pair of adjacent perimeter walls form an interior right or 90 degree angle.

The perimeter walls 4-5 and 7-8 stand generally upwardly, so as to be upstanding, from a bottom 10 of the containment structure to delimit thereover an interior 12 for containing the particulate material. In the illustrated arrangement, the bottom 10 of the containment structure is a hopper bottom which comprises a plurality of bottom discharges 14, specifically a pair thereof, towards which forward and rear bottom walls 10A and 10B (shown in stippled line in FIG. 1) are sloped downwardly and longitudinally inwardly. The bottom 10 is generally funnel-shaped around each of the discharges 14. The interior 12 is compartmentalized into front and rear particulate material storage compartments 12A, 12B by a longitudinally-centrally located laterally-extending vertically-upstanding divider wall 16 (shown in stippled line in FIG. 1) which spans between the side perimeter walls 7 and 8.

The containment structure 1 has an open top 18 defined by tops 4A, 5A, 7A and 8A of the perimeter walls through which the particulate material is passed into the interior 12. In the illustrated arrangement, the tops 7A, 8A of the side walls are straight or linear, and the tops 4A, 5A of the front and rear walls are defined by generally arch-shaped end caps which extend above the tops 7A, 8A of the side walls.

The open top 18 of the containment structure is selectively coverable by a covering sheet 21 arranged to span across the open top 18 of the containment structure in an extended position, as shown more clearly in FIG. 2B, to substantially enclose the interior 12 of the containment structure. That is, in the extended position the covering sheet 21 substantially spans between the tops of all of the perimeter walls, and more specifically it spans laterally between the tops 7A, 8A of the side walls and longitudinally between the tops 4A, 5A of the end walls. However, in order to enable loading, the covering sheet 21 is operatively configured for movement relative to the open top 18 between the extended position and a retracted position, as for example shown in FIG. 2A, in which the open top 18 is substantially unobstructed by the covering sheet 21 so that the particulate material can be suitably loaded into the containment structure through the open top thereof. The covering sheet 21 has a movable leading end 22A of the covering sheet which is movable relative to the open top 18 and relative to an anchored end 22B of the covering sheet which is attached in fixed relation to the containment structure 1.

In the illustrated arrangement, the covering sheet 21 is a single piece of imperforate flexible material without a predefined three-dimensional shape, such as canvas, sized at least to span between the tops of the perimeter walls. Generally speaking, the flexible covering sheet 21 is sized slightly larger than the open top 18 so that a peripheral end portion of the sheet along its periphery overlaps the tops of the perimeter walls. The flexible covering sheet 21 is operatively configured for movement between the extended and retracted positions by attachment at one end 22A thereof to a cylindrical spool 24, onto which the flexible covering sheet can be wound so as to be arranged in the retracted position, and by attachment at an opposite end 22B to one of the perimeter walls of the containment structure, which in the illustrated arrangement is that wall indicated at 8. The spool 24 in turn is supported for movement across the tops of the perimeter walls between the retracted position in which the spool is located substantially to one side of the containment structure 1 at one of the perimeter walls to which the anchored end 22B of the covering sheet is attached, and the extended position in which the spool 24 is substantially located to one side of the containment structure opposite to where the anchored end 22B of the covering sheet is attached thereto. Furthermore, in the retracted position the covering sheet 21 is substantially wholly windingly received on the spool, and in movement to the extended position the spool windingly dispenses the covering sheet in trailing condition thereto as the spool traverses the open top 18 of the containment structure in a direction which is perpendicular to a rotational axis 24A of the spool.

The spool 24 extends longitudinally of the containment structure 1 such that the covering sheet 21 is movable between the retracted and extended positions in the lateral direction of the containment structure. Thus the spool 24 is supported for rolling movement across the tops 4A, 5A of the laterally extending front and rear walls 4, 5. In the illustrated arrangement the spool 24 is operatively mounted to the containment structure by a pair of folding arms 28, at least one of which is driven, so as to drive the spool 24 in the movement across the top of the containment structure. It will be appreciated that in other arrangements which are not shown, the covering sheet may be formed by a plurality of telescoping rigid panels or may be a pair of flexible covering sheets which meet at a longitudinally central location to collectively form a substantially continuous covering sheet in the extended position and which are retractable each in an opposite longitudinally outward direction such that each one of the pair of sheets collapses on itself in bellows-like fashion.

Turning back in more detail to the containment structure, the open top 18 is interrupted by at least one arched cover-supporting cross-member 32 which is arranged to support the covering sheet 21 in the extended position and which is sized so as to substantially not inhibit or impede passage of the particulate material through the open top. Each arched cover supporting cross-member 32 spans laterally between the laterally opposite pair of the perimeter walls 7, 8 and extends above the tops 7A, 8A thereof so as to have a central apex 35 raised above opposite lower ends 37A, 37B of the respective arched cover supporting cross-member. The lower ends 37A, 37B are usually connected to the tops of the side walls 7, 8, where there are located longitudinally-extending structural beams 40 respectively on an inner side of each side wall, and thus the arched cover-supporting cross-member follows a slightly more arcuate path than the end caps defining the tops 4A, 5A of the end walls 4, 5. Each cross-member 32 also is rigid so as to guide the covering sheet 21 in a predefined path across the open top 18 of the containment structure in the extended position of the covering sheet. Typically, and as in the illustrated arrangement, there is provided a plurality of the arched cover-supporting cross members 32 arranged substantially parallel to each another at longitudinally spaced locations of the containment structure between the longitudinally opposite pair of the perimeter walls 4, 5.

Additional support for the covering sheet 21 is provided in the form of at least one longitudinally extending cover support member 43 which is arranged to cooperate with the at least one arched cover supporting cross-member 32 to support the covering sheet 21 in the extended position. The at least one longitudinal cover support member 43 extends crosswise to the arched cover-supporting cross-members 32. In the illustrated arrangement, the longitudinal cover support member 43 is flexible, so as to be in the form of a flexible strap, and rests on top of the respective arched cover-supporting cross member. The longitudinal cover support member 43 of the illustrated arrangement spans between the longitudinally opposite pair of the perimeter walls 4, 5 and is connected at the tops 4A, 5A thereof. Also there is provided a plurality of the longitudinal cover support members, specifically two, on either side of a lateral center of the containment structure 1. These longitudinal support members 43 may help prevent sagging of the flexible covering sheet in gaps between the arched cover-supporting cross members 32.

For portability the containment structure 1 is mounted on top of a frame 45 extending longitudinally between a front end 45A and a rear end 45B, which is rollably supported on the ground by wheels 46 located at the rear end 45B. A hitching element in the form of a downwardly depending king pin 47 is connected at the front end 45A of the frame for connecting to a highway tractor.

Figure 4:
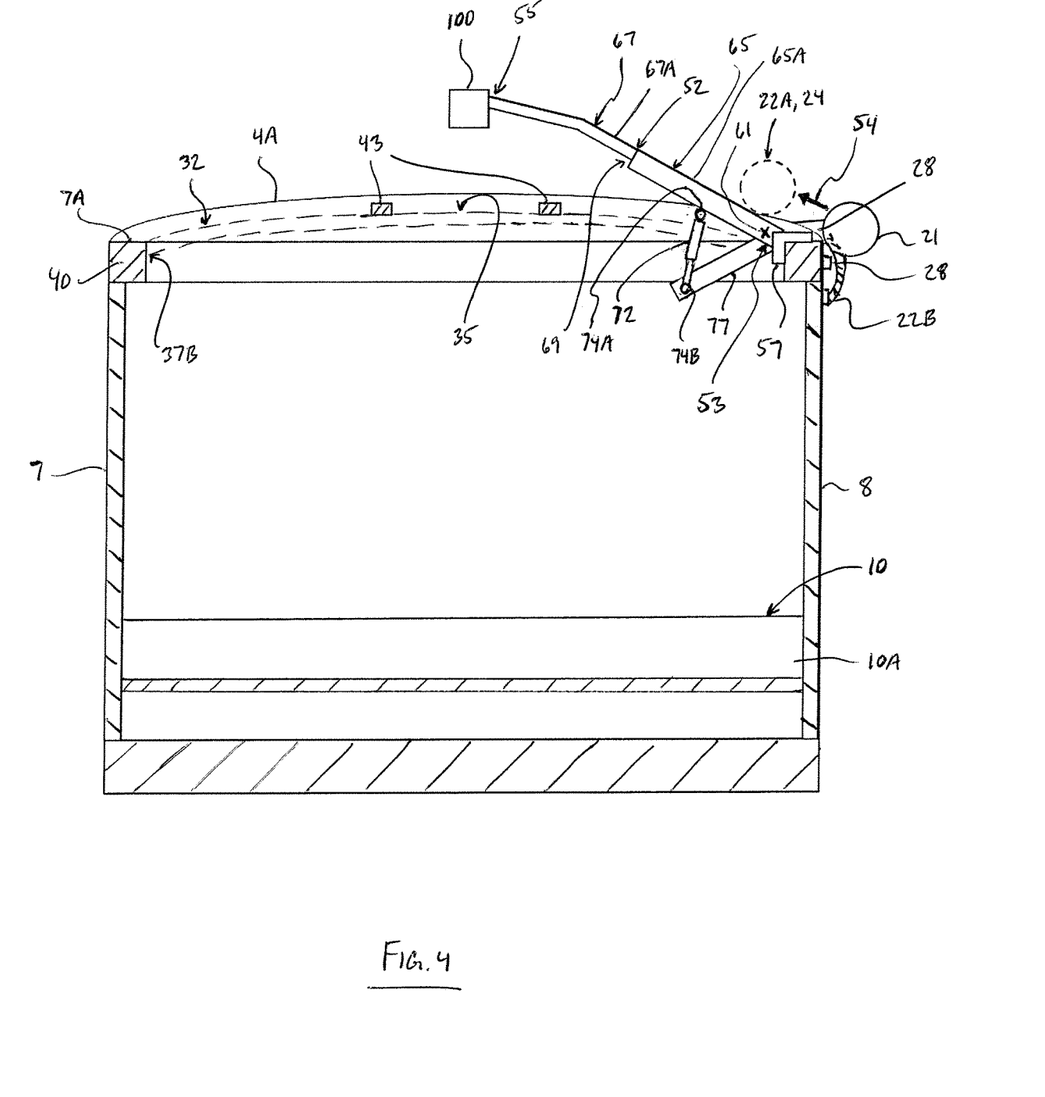
FIG. 4 is a cross-sectional view along line 4-4 in FIG. 1, where an arched cover-supporting cross-member is shown in stippled line to show relative spatial relation thereof to other parts of the containment structure and the apparatus.
Figure 5:
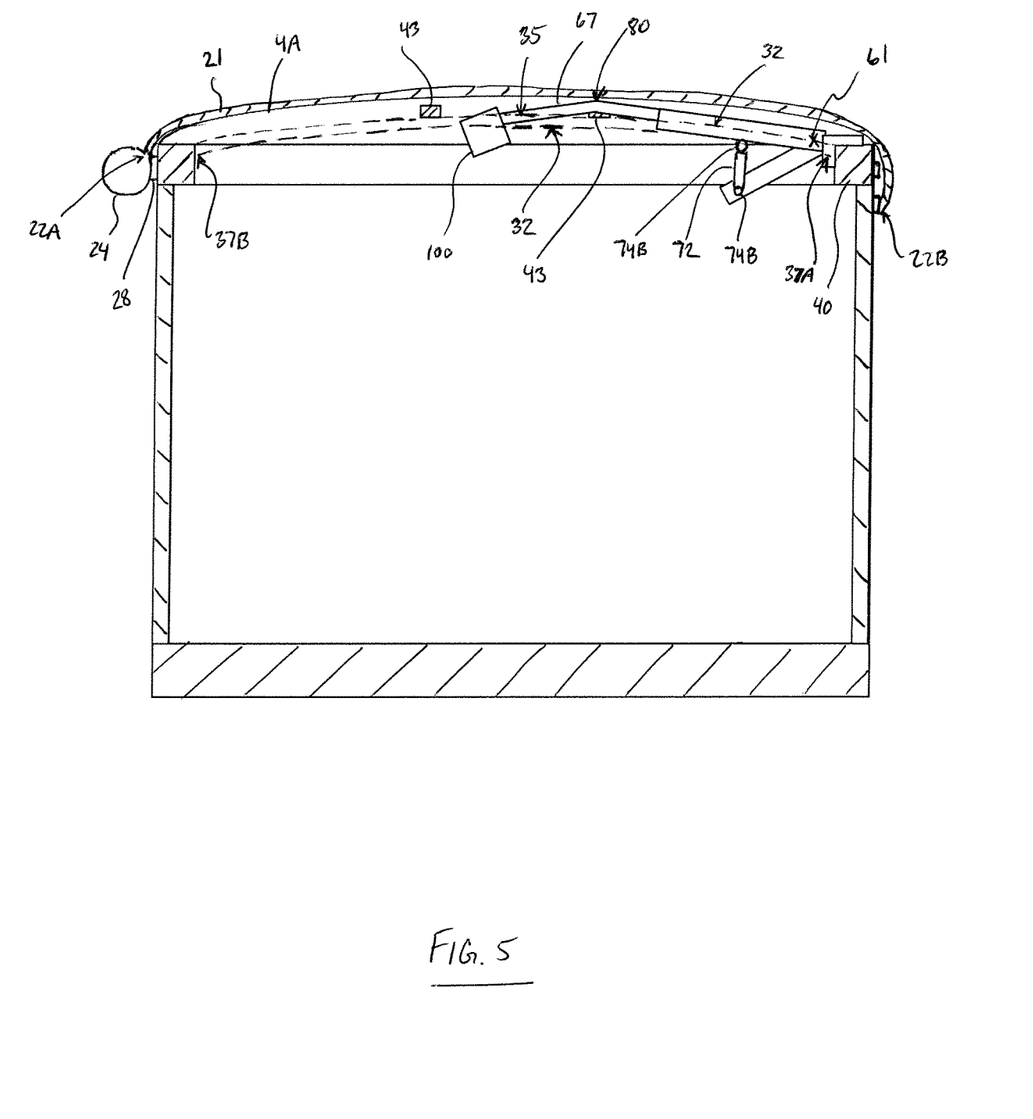
FIG. 5 is a cross-sectional view similar to FIG. 4 but showing the sensor-supporting apparatus in a lowered transport position.

Turning now to the apparatus 50, and referring particularly to FIGS. 4-5, the apparatus comprises a sensor support arm 52 extending in a longitudinal direction of the support arm but relative to the containment structure 1 substantially in the lateral direction thereof from a mounting end 53 thereof, which is arranged for attaching to the containment structure 1 at a fixed location within a periphery of the containment structure defined by the perimeter walls 4-5, 7-8, so as to be within the interior 12 of the containment structure, and lying along a path of the movement of the covering sheet from the retracted position to the extended position that is generally indicated by the arrow 54, to a distal free end 55 of the arm which is arranged to be disposed above the tops 4A, 5A, 7A and 8A of the perimeter walls at a location within the periphery of the containment structure in a raised monitoring position of the arm 52, as shown more clearly in FIG. 4. The mounting end 53 of the sensor support arm 52 is arranged to be attached to or in proximity to the top of one of the perimeter walls alongside which the covering sheet 21 is located in the retracted position, which in the illustrated arrangement is the side wall 8. In other words, the mounted end 53 is located proximate or much closer to the top than to the bottom of this wall. In the illustrated arrangement, the mounting end 53 is supported on a bracket 57 connected to the top 8A of the wall 8. The support arm 52 is thus arranged to extend over the containment structure, but in a manner so as to substantially not impede loading of the particulate material, particularly by appropriate sizing of the support arm 52.

The sensor support arm 52 is configured to receive the sensor 100 at or in proximity to the distal end 55 thereof so as to locate the sensor 100 over the bottom 10 of the containment structure and above the tops 4A-5A, 7A-8A of the perimeter walls in the raised monitoring position of the sensor support arm. In other words, the sensor 100 is supported at a location on the support arm 52 which is proximate or closer to the distal end 55 than the mounting end 53 so that the sensor is held by the support arm at a raised height above the top 18 of the containment structure 1. This also enables the sensor to be located at an inwardly spaced position from the periphery of the containment structure 1.

The support arm 52 thus extends from the mounting end 53 which is located, relative to the containment structure 1, inwardly of the covering sheet 21 disposed in the retracted position, through the open top 18 of the containment structure to the distal end 55 located vertically above the bottom 10 and at a raised height above the tops of the perimeter walls such that the arm 52 is positioned in a manner which otherwise obstructs movement of the covering sheet 21 to the extended position. As such, the sensor support arm 52 is arranged to be movable relative to the perimeter walls 4-5, 7-8 of the containment structure 1 from the raised monitoring position to a lowered transport position, as shown in FIG. 5, in which the distal end 55 of the sensor support arm 52 is arranged to be substantially received in the interior 12 of the containment structure responsive to the movement of the covering sheet 21 from the retracted position to the extended position. More specifically, the sensor support arm 52 is arranged to be displaced from the raised monitoring position to the lowered transport position upon physical engagement with the movable leading end 22A of the covering sheet which is defined by the spool 24 to which the sheet is connected. FIG. 4 shows in stippled line an initial contact position of the spool 24 (and accordingly the movable leading end 22A of the covering sheet 21) relative to the sensor support arm 52, after the spool 24 has been displaced in the direction of arrow 54 a short distance from the fully retracted position of the covering sheet (shown in solid line), and at which position the movable leading end 22A of the covering sheet generally contacts the sensor arm 52 in order to activate the consequent movement of the arm to the lowered transport position.

The movement of the sensor support arm 52 from the raised monitoring position to the lowered transport position is pivotal about a pivot axis 61 defined at the fixedly located mounting end 53 of the sensor support arm. The pivot axis 61 is arranged to be oriented substantially perpendicularly to a direction of movement of the covering sheet from the retracted position to the extended position as indicated by arrow 54.

In the raised monitoring position the sensor support arm is inclined upwardly and in the direction of the movement of the covering sheet from the retracted position to the extended position indicated by arrow 54. Thus in the initial contact position of the covering sheet's movable end 22A as shown in stippled line in FIG. 4 the sensor arm 52 provides a ramped upper surface allowing the arm 52 to be gradually deflected to the lowered transport position upon the continued movement of the covering sheet to the extended position traversing its regular path thereto from the retracted position.

For strength and longevity of the sensor support arm 52, so that it can be subjected to repeated contact with the spool 24 defining the movable end 22A of the covering sheet, the sensor arm 52 comprises a base portion 65 which defines the mounting end which is thickened at or adjacent the mounting end 53 so as to be enlarged relative to a distal portion 67 of the sensor support arm defining the distal end in a thickness direction transverse to the longitudinal direction. In the illustrated arrangement, the base and distal portions 65, 67 of the arm have contiguous upper surfaces 65A, 67A which engage the spool 24, thickening of the base portion 65 acts to form a bottom shoulder 69 at a transition between the base and distal portions.

In order to provide controlled lowering of the sensor support arm 52 to the transport position, the apparatus 50 includes a biasing element 72 operatively coupled to the sensor support arm 52 for biasing the sensor support arm to the raised monitoring position. This also acts to automatically urge the sensor support arm 52 back to the raised monitoring position when the covering sheet 21 is moved from the extended position to the retracted position.

The biasing element 72 is of the type arranged to resist compression between opposite ends 74A, 74B thereof, so as to bias the sensor support arm to the raised monitoring position. In the illustrated arrangement this element 72 is a gas spring which uses compressed gas, for example air, contained within an enclosed cylinder sealed by a sliding piston to pneumatically store potential energy and withstand external force applied parallel to the direction of the piston shaft.

The compressive biasing element 72 is pivotally operatively attached at an upper end 74A thereof to an underside of the sensor support arm 52 at a spaced location thereon from the pivot axis 61 and at an opposite lower end 74B of the biasing element to a stationary second arm 77 which is distinct from the sensor support arm 52 and arranged to be connected in fixed relation to the containment structure 1. In the illustrated arrangement, the secondary arm 77 also is attached at a common mounting location with the sensor support arm 52 via the bracket 57. The stationary second arm 77 is arranged to extend into the interior 12 of the containment structure. As both the sensor support arm 52 and stationary second arm 77 share a common mounting location, the second arm 77 extends in a common longitudinal direction as the sensor arm 52 but downwardly towards the bottom 10 of the containment structure such that the two arms 52, 77 are disposed in diverging condition to one another.

The lower end 74B of the biasing element is operatively connected to the stationary second arm 77 at a spaced location thereon to the bracket 57 and at such a distance in comparison to a distance of the upper end 74A from the bracket 57 such that the biasing element 72 is oriented more vertically upright in the lowered transport position of the sensor support arm than in the raised monitoring position thereof. This orientation may provide more control during return upward movement of the sensor support arm 52 to the raised monitoring position when the support arm is in cooperative contact with the spool 24 as the movable leading end 22A of the covering sheet is displaced back to the retracted position of the covering sheet 21.

To ensure that the sensor support arm 52 fits suitably underneath the covering sheet in the extended position, the arm 52 follows a generally curved path from the mounting end 53 to the distal end 55 so as to generally match a shape of the at least one arched cover supporting cross-member 32 between the apex 35 thereof and one of the lower ends 37A which is located on the same side of the containment structure 1 as the mounting end 53 of the sensor support arm. In the illustrated arrangement, the sensor arm 52 follows a similar curvature to the arched cover-support cross-member from the mounting end 53 to an intermediary point or location 80 along the arm proximate the distal end 55, where the distal portion 67 of the arm exhibits a more aggressive bend so as to locate in the lowered transport position the sensor 100 in spaced condition to the covering sheet 21 in the extended position. In the illustrated arrangement the intermediary location 80 coincides in the lowered transport position with the proximal one of the longitudinal cover support members 43, that is that which is closest to the mounting end 53 of the sensor arm 52. Furthermore, the distal portion 67 of the sensor support arm 52 has reduced thickness compared to the base portion as the distal portion 67. This is because the distal portion is arranged to overlay at least one of the longitudinal cover support members 43 which is located beneath the sensor support arm in the raised monitoring position and be sandwiched between same and the covering sheet 21 in the lowered transport position of the sensor support arm 52. In the illustrated arrangement, the sensor 100 is a video camera with its lens oriented generally downwardly so as capture images of the interior 12 of the containment structure. The sensor 100 is operatively communicated with a remote video monitor (not shown) available to the highway tractor operator such as in the highway tractor to display a live video feed during loading, such that loading of the particulate material can be visually monitored remotely of the containment structure. The sensor 100 of the illustrated arrangement is thus configured to monitor loading.

Also, in the illustrated arrangement there is provided a pair of the apparatus 50 at longitudinally spaced locations of one another and each also spaced longitudinally inwardly from the front and rear walls 4, 5 of the containment structure. The sensors 100 may be arranged at suitable heights relative above the top of the divider wall 16 and at longitudinally spaced locations from the ends of the containment structure 1 a so that each sensor can suitably monitor the compartment 12A or 12B over which it is disposed but also provide a different at least partial viewing perspective for the other compartment directly monitored by the other one of the sensors.

This provides an arrangement which positions the sensor vertically above the containment structure and which can remain mounted to the containment structure even when not in use to monitor loading, such as when the covering sheet in the extended position. Furthermore, the sensor is protected by the covering sheet during transport as it is contained within the enclosed interior formed by the covering sheet disposed in the extended position.

The scope of the claims should not be limited by the preferred embodiments set forth in the examples but should be given the broadest interpretation consistent with the specification as a whole.

The invention claimed is:

1. An apparatus for use with a sensor configured to monitor loading of particulate material into a containment structure having a plurality of perimeter walls upstanding from a bottom of the containment structure to delimit thereover an interior for containing the particulate material, the containment structure having an open top defined by tops of the perimeter walls through which the particulate material is passed into the interior, the open top of the containment structure being selectively coverable by a covering sheet arranged to span across the open top of the containment structure in an extended position to substantially enclose the interior of the containment structure, the covering sheet being operatively configured for movement relative to the open top between the extended position and a retracted position in which the open top is substantially unobstructed by the covering sheet so that the particulate material can be suitably loaded into the containment structure through the open top thereof, in combination with the containment structure the apparatus comprising:

a sensor support arm extending from a mounting end attached to the containment structure at a location which is within a periphery of the containment structure defined by the perimeter walls and lying along a path of the movement of the covering sheet from the retracted position to the extended position, to a distal end of the sensor support arm disposed above the tops of the perimeter walls at a location within the periphery of the containment structure in a raised monitoring position of the sensor support arm;

the sensor support arm being configured to receive the sensor at or in proximity to the distal end thereof so as to locate the sensor over the bottom of the containment structure and above the tops of the perimeter walls in the raised monitoring position of the sensor support arm; and the sensor support arm being movable relative to the perimeter walls of the containment structure from the raised monitoring position to a lowered transport position in which the distal end of the sensor support arm is substantially received in the interior of the containment structure responsive to the movement of the covering sheet from the retracted position to the extended position.

2. The apparatus of claim 1 wherein the sensor support arm is displaceable from the raised monitoring position to the lowered transport position upon engagement with a movable leading end of the covering sheet which is movable relative to an anchored end of the covering sheet attached in fixed relation to the containment structure.

3. The apparatus of claim 2 wherein in the raised monitoring position the sensor support arm is inclined upwardly and in a direction of the movement of the covering sheet from the retracted position to the extended position.

4. The apparatus of claim 2 further including a biasing element operatively coupled to the sensor support arm for biasing the sensor support arm to the raised monitoring position.

5. The apparatus of claim 4 wherein the biasing element is arranged to resist compression between opposite ends thereof so as to bias the sensor support arm to the raised monitoring position.

6. The apparatus of claim 5 wherein the biasing element is a gas spring.

7. The apparatus of claim 5 further including a stationary second arm which is distinct from the sensor support arm and connected in fixed relation to the containment structure, the stationary second arm extending into the interior of the containment structure, and wherein a first one of the opposite ends of the biasing element is operatively connected to the sensor support arm and a second one of the opposite ends is operatively connected to the stationary second arm.

8. The apparatus of claim 7 wherein the sensor support arm is pivotally movable between the raised monitoring and lowered transport positions, and the biasing element is oriented more vertically upright in the lowered transport position of the sensor support arm than in the raised monitoring position thereof.

9. The apparatus of claim 2 wherein the sensor support arm extends in a generally longitudinal direction from the mounting end to the distal end, and includes a thickened base portion at or adjacent the mounting end which is enlarged relative to a distal portion of the sensor support arm defining the distal end in a thickness direction transverse to the longitudinal direction.

10. The apparatus of claim 1 wherein the mounting end of the sensor support arm is attached to or in proximity to the top of one of the perimeter walls of the containment structure.

11. The apparatus of claim 10 wherein, when the covering sheet is located substantially to one side of the containment structure at one of the perimeter walls in the retracted position of the covering sheet, the mounting end of the sensor support arm is attached to said one of the perimeter walls.

12. The apparatus of claim 1 wherein the sensor support arm is pivotally movable from the raised monitoring position to the lowered transport position about a pivot axis defined at the mounting end of the sensor support arm.

13. The apparatus of claim 12 wherein the pivot axis is oriented substantially perpendicularly to a direction of movement of the covering sheet from the retracted position to the extended position.

14. The apparatus of claim 1 wherein, when (i) the containment structure is longitudinally elongated, so as to comprise a laterally opposite pair of the perimeter walls extending longitudinally of the containment structure which are sized larger in width in the longitudinal direction than a width in a lateral direction of a longitudinally opposite pair of the perimeter walls extending laterally of the containment structure, (ii) the covering sheet is movable from the retracted position to the extended position in the lateral direction of the containment structure, and (iii) the containment structure includes at least one arched cover supporting cross-member arranged to support the covering sheet in the extended position, the at least one arched cover supporting cross-member spanning laterally between the laterally opposite pair of the perimeter walls and extending above the tops thereof so as to have a central apex raised above opposite lower ends of the at least one arched cover supporting cross-member, the sensor support arm extends substantially laterally of the containment structure and follows a generally curved path from the mounting end to the distal end so as to generally match a shape of the at least one arched cover supporting cross-member between the apex and one of the lower ends.

15. The apparatus of claim 14 wherein, when the containment structure further includes at least one longitudinally extending cover support member arranged to cooperate with the at least one arched cover supporting cross-member to support the covering sheet in the extended position, the at least one longitudinal cover support member extending crosswise to said at least one arched cover supporting cross-member at a location beneath the sensor support arm in the raised monitoring position, the sensor support arm comprises a reduced thickness portion which, in the lowered transport position, overlies the at least one longitudinal cover support member and is substantially sandwiched between said at least one longitudinal cover support member and the covering sheet in the extended position.

* * * * *